(12) United States Patent
Honkura et al.

(10) Patent No.: US 7,886,600 B2
(45) Date of Patent: *Feb. 15, 2011

(54) MOTION SENSOR AND PORTABLE TELEPHONE USING THE SAME

(75) Inventors: Yoshinobu Honkura, Aichi (JP); Michiharu Yamamoto, Aichi (JP); Masaki Mori, Aichi (JP); Eiji Kako, Aichi (JP); Toshiro Matsumura, Tokyo (JP); Jun Yamazaki, Tokyo (JP); Hirohisa Kusuda, Tokyo (JP); Yasuhiro Nishide, Tokyo (JP); Daisuke Tsujino, Tokyo (JP)

(73) Assignees: Aichi Steel Corporation, Tokai-shi (JP); Softbank Mobile Corp., Tokyo (JP)

( * ) Notice: Subject to any disclaimer, the term of this patent is extended or adjusted under 35 U.S.C. 154(b) by 1262 days.

This patent is subject to a terminal disclaimer.

(21) Appl. No.: 11/444,459

(22) Filed: Jun. 1, 2006

(65) Prior Publication Data
US 2007/0068252 A1    Mar. 29, 2007

(30) Foreign Application Priority Data
Sep. 29, 2005   (JP)   .............................. 2005-284598

(51) Int. Cl.
*G01P 15/08* (2006.01)
(52) U.S. Cl. .................................................. 73/514.31
(58) Field of Classification Search .............. 73/514.31, 73/514.16, 514.01, 514.02, 514.15, 514.29, 73/514.35
See application file for complete search history.

(56) References Cited

U.S. PATENT DOCUMENTS

| | | | | |
|---|---|---|---|---|
| 4,212,041 A | * | 7/1980 | Lazzari et al. | .............. 360/315 |
| 4,603,365 A | * | 7/1986 | Nakamura | .................... 362/55 |
| 4,825,697 A | * | 5/1989 | Huber | ..................... 73/514.14 |
| 4,849,655 A | * | 7/1989 | Bennett | .................... 73/514.31 |
| 4,967,598 A | * | 11/1990 | Wakatsuki et al. | ........ 73/514.12 |
| 5,027,657 A | * | 7/1991 | Juckenack et al. | ........ 73/514.13 |
| 7,219,549 B2 | * | 5/2007 | Honkura et al. | ........... 73/514.31 |
| 7,420,364 B2 | * | 9/2008 | Honkura et al. | .............. 324/247 |

(Continued)

FOREIGN PATENT DOCUMENTS

EP    1 591 792 A2    11/2005

(Continued)

*Primary Examiner*—Helen C. Kwok
(74) *Attorney, Agent, or Firm*—Oblon, Spivak, McClelland, Maier & Neustadt, L.L.P.

(57) ABSTRACT

A motion sensor which can easily and accurately detect bearing, attitude and acceleration in any of three-dimensional directions and a portable telephone using the same. The motion sensor comprises three magnetic sensing parts for detecting magnetic field strength in 3-axis directions orthogonal to one another, and three acceleration sensing parts for detecting accelerations in the 3-axis directions. Each of the acceleration sensing parts has a magnet body constituted to be able to displace depending on acceleration, and a magnet displacement detection head for detecting a displacement of the magnet body. The three magnetic sensing parts and the three magnet displacement detection heads are all made of the same type of magnetic detection elements which operate based on common operation principles. The three magnetic sensing parts and the three acceleration sensing parts are integrated into one modular package together with one electronic circuit for controlling these six magnetic detection elements.

24 Claims, 18 Drawing Sheets

U.S. PATENT DOCUMENTS

2004/0124835 A1  7/2004  Kimura

FOREIGN PATENT DOCUMENTS

| | | |
|---|---|---|
| EP | 1 628 114 A1 | 2/2006 |
| JP | 2000-258449 | 9/2000 |
| JP | 2001-83224 | 3/2001 |
| JP | 2001-272413 | 10/2001 |
| JP | 2003-172633 | 6/2003 |
| JP | 2004-191101 | 7/2004 |
| JP | 2005-192206 | 7/2005 |
| JP | 2006-72516 | 3/2006 |
| KR | 10-2006-0043771 | 5/2006 |
| WO | WO 2004/001337 A1 | 12/2003 |
| WO | WO 2004/020951 A1 | 3/2004 |
| WO | WO 2004/042322 A1 | 5/2004 |

* cited by examiner

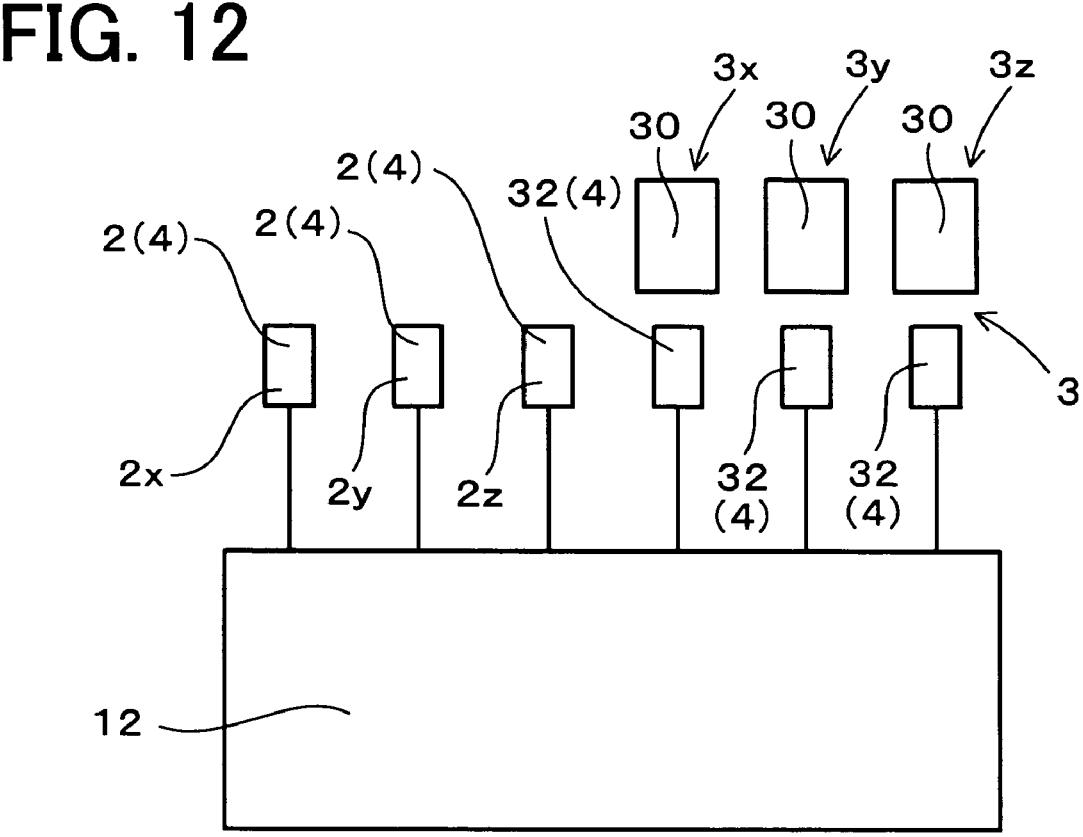

MOTION SENSOR AND PORTABLE TELEPHONE USING THE SAME

CROSS-REFERENCES TO RELATED APPLICATIONS

The present application claims priority under 35 U.S.C.§119 to Japanese Patent Application No. 2005-284598, filed Sep. 29, 2005, entitled "MOTION SENSOR AND PORTABLE TELEPHONE USING THE SAME". The contents of this application are incorporated herein by reference in their entirety.

BACKGROUND OF THE INVENTION

1. Field of the Invention

The present invention relates to a motion sensor for detecting a bearing and an acceleration, and to a portable telephone using such a motion sensor.

2. Description of the Related Art

An attitude detection sensor for detecting a bearing and a tilt is known, which is composed of a combination of a 3-axis magnetic sensing part and a 2- or more axis acceleration sensing part. More specifically, such an attitude detection sensor is constituted, a magnetic sensing part using a Hall device and an acceleration sensing part including a stress sensing element for detecting displacement of a weight which moves depending on a gravitational force applied to the weight (as disclosed, for example, in Patent Document 1).

However, the conventional attitude detection sensor has the following problems. In this attitude detection sensor, because the magnetic sensing part and the acceleration sensing part are based on different measurement principles, it is difficult to achieve an efficient disposition of these sensors, and thus it is difficult to achieve miniaturization of total size of an attitude detection sensor. Besides, the magnetic sensing part and the acceleration sensing part need completely different electronic circuits for processing signals output from these sensors. The necessity for two different types of electronic circuits also makes it difficult for the attitude detection sensor to have a sufficiently small size. Also, if the acceleration sensing parts are disposed to be adaptable for only two-axis directions, it is difficult to accurately detect acceleration in all directions.

[Patent document 1] JP 2003-172633 Unexamined Patent Publication (Kokai)

In view of the above-mentioned problems with the related art, an object of the present invention is to provide a motion sensor which can easily and accurately detect bearing, attitude and acceleration in any of three-dimensional directions.

SUMMARY OF THE INVENTION

According to a first aspect, the present invention provides a motion sensor comprising:

three magnetic sensing parts for detecting magnetic field strength in 3-axis directions orthogonal to one another;

and three acceleration sensing parts for detecting accelerations in the 3-axis directions;

wherein each of the acceleration sensing parts has a magnet body constituted to be able to displace depending on acceleration, and a magnet displacement detection head for detecting a displacement of the magnet body, the three magnetic sensing parts and the three magnet displacement detection heads being all made of the same type of magnetic detection elements which operate based on common operation principles, the three magnetic sensing parts and the three acceleration sensing parts being integrated into one modular package together with one electronic circuit for controlling a total of six magnetic detection elements.

The operation and effect of the present invention will be described below.

Since the motion sensor includes the three magnetic sensing parts and the three acceleration sensing parts, it is possible to three-dimensionally detect the bearing, attitude and acceleration of an object to which is mounted the motion sensor.

More specifically, since the magnetic sensing parts detect the geomagnetism and the acceleration sensing parts detect the acceleration of gravity, the bearing and attitude of the object can be detected. Further, since the magnetic sensing parts and the acceleration sensing parts are disposed three for each type of the parts to lie in the 3-axis directions, the bearing and attitude of the object can be detected three-dimensionally. Here, the term "attitude" means, e.g., absolute angles or relative angles of pitch, yaw and roll of the object.

In addition, the provision of the three acceleration sensing parts enables the direction and magnitude of acceleration to be detected in any of three-dimensional directions.

The three magnetic sensing parts and the three magnet displacement detection heads are all made of the same type of magnetic detection elements which operate based on the common operation principles. Therefore, electronic circuits for controlling the magnetic detection elements can be operated based on the same principles, and the number of required electronic circuits can be reduced to just one. As a result, the motion sensor can be easily simplified and downsized.

Moreover, since the motion sensor is constituted in the form of a module obtained by integrating the one electronic circuit, the three magnetic sensing parts, and the three acceleration sensing parts into one package, the motion sensor can be more easily simplified and downsized.

Since the motion sensor includes the three magnetic sensing parts for detecting the magnetic field strength in respective direction along 3-axis perpendicular to each other and the three acceleration sensing parts for detecting the accelerations in the 3-axis directions, it is possible to easily compensate the influence of an ambient magnetic field upon the acceleration sensing parts. More specifically, the ambient magnetic field, e.g., the geomagnetism, other than the magnetism generated by the magnet body may act on the magnet displacement detection heads of the acceleration sensing parts, or the magnet body may be displaced due to the action of magnetic forces of the ambient magnetic field in some cases. Using output values of the three magnetic sensing parts enables compensation of errors in the values of accelerations detected by the acceleration sensing parts, which are attributable to the ambient magnetic field acting on the magnet displacement detection heads and the displacement of the magnet body due to the action of magnetic forces of the ambient magnetic field.

Further, the magnetic sensing parts are disposed three in directions corresponding to the acceleration sensing parts and are made of the same type of magnetic detection elements which operate based on the operation principles common to the magnet displacement detection heads of the acceleration sensing parts. Accordingly, the compensation of the above-mentioned errors in the detected values of accelerations can be performed with ease. In addition, since the magnetic sensing parts are integrated into one modular package together with the acceleration sensing parts and both the parts are disposed close to each other, high accuracy is ensured in the compensation of the errors.

Moreover, an error in the bearing obtained by the three magnetic sensing parts can also be compensated based on attitude information obtained by the three acceleration sensing parts.

According to the first aspect of the present invention, as described above, the motion sensor can be provided which is able to easily and accurately detect bearing, attitude and acceleration in any of three-dimensional directions.

According to a second aspect, the present invention provides a portable telephone equipped with the motion sensor, the motion sensor comprising:

three magnetic sensing parts for detecting magnetic field strength in 3-axis directions orthogonal to one another;

and three acceleration sensing parts for detecting accelerations in the 3-axis directions;

wherein each of the acceleration sensing parts has a magnet body constituted to be able to displace depending on acceleration, and a magnet displacement detection head for detecting a displacement of the magnet body, the three magnetic sensing parts and the three magnet displacement detection heads being all made of the same type of magnetic detection elements which operate based on common operation principles, the three magnetic sensing parts and the three acceleration sensing parts being integrated into one modular package together with one electronic circuit for controlling a total of six magnetic detection elements.

According to the second aspect of the present invention, the portable telephone can be provided which is able to easily and accurately detect bearing, attitude and acceleration in any of three-dimensional directions.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 12 is a block diagram showing a circuit configuration to control the six magnetic detection elements by using one electronic circuit in the first embodiment;

DESCRIPTION OF THE PREFERRED EMBODIMENTS

Figure 1:
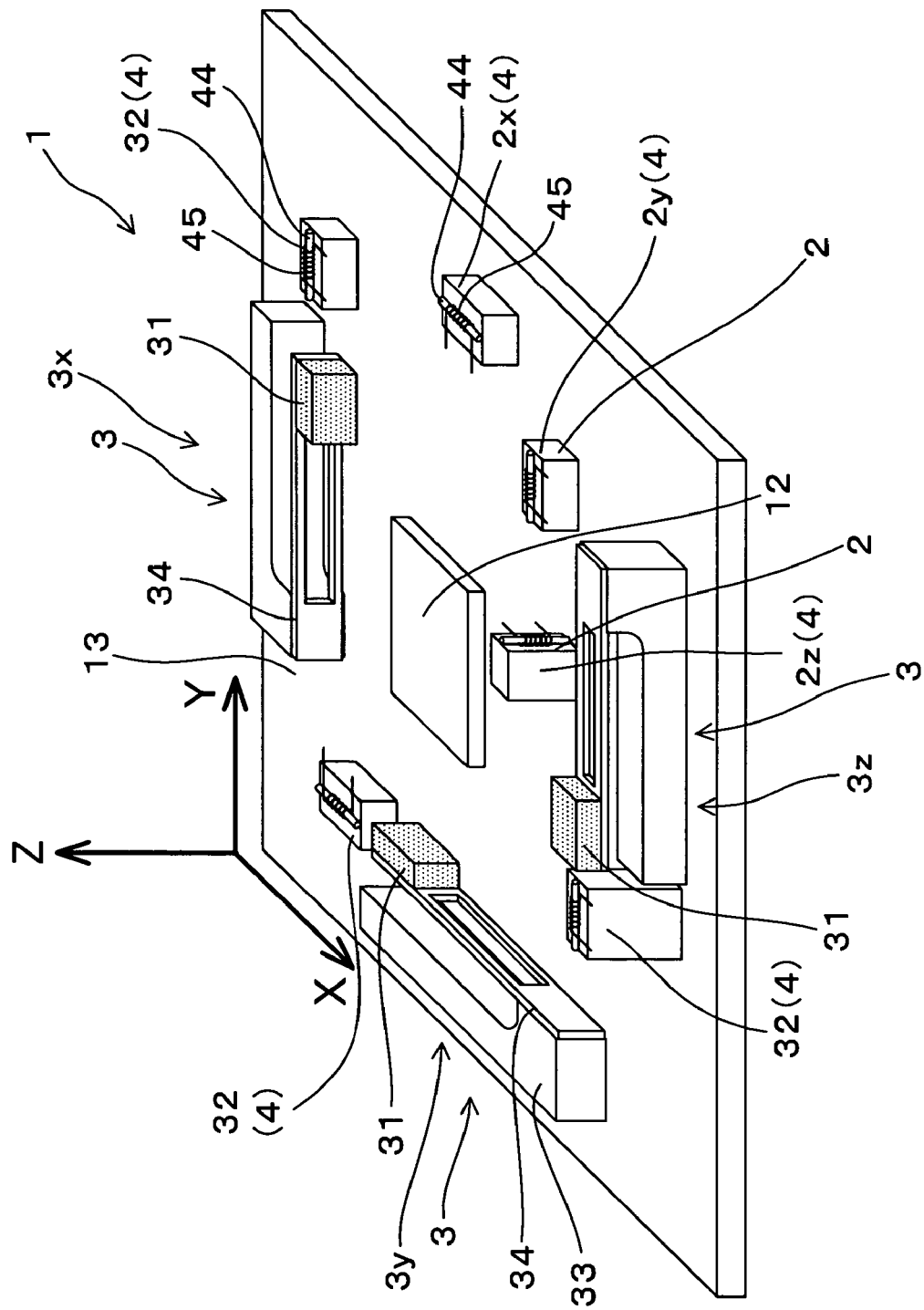
FIG. 1 is a schematic perspective view of a motion sensor according to a first embodiment.

The motion sensor according to the first aspect of the present invention can be applied to control in not only portable equipment such as portable telephones, but also in automobiles, autonomously movable robots, robot manipulators, etc.

The magnetic detection elements can be constituted by any suitable elements for detecting magnetism, e.g., Hall devices, magneto-impedance sensor elements, magnetic resistance devices, or flux gates. Also, the magnet body can be made of, e.g., a ferrite or rare-earth magnet.

Furthermore, the acceleration detected by the acceleration sensing part includes motional acceleration and gravitational acceleration.

It is preferable that the magnet body is fixed to the other end of a cantilever having one end fixed to a support post which is fixedly provided in the package, and the respective cantilevers of the three acceleration sensing parts are arranged with longitudinal directions thereof being parallel to the same plane.

In this case, the motion sensor having a small size and a thin thickness can be easily obtained. As a result, the motion sensor can be mounted in small and thin equipment.

It is preferable that the magnetic detection elements constituting the three magnetic sensing parts and the magnetic detection elements constituting the three magnet displacement detection heads are each made of a magneto-impedance sensor element.

In this case, the motion sensor having high accuracy and a small size can be easily obtained.

More specifically, the magneto-impedance (MI) sensor element has so high sensitivity that it can detect the weak geomagnetism with high accuracy and can detect a small displacement of the magnet body with high accuracy. Also, since the magneto-impedance sensor element is small in size, the motion sensor can be realized with a smaller size.

It is preferable that the magnet displacement detection head includes a main detection section for detecting magnetism generated by the magnet body, and a compensating detection section for detecting an ambient magnetic field acting on the magnet displacement detection head, the main detection section and the compensating detection section being arranged to be able to detect magnetism in the same axial direction such that an output signal of the magnet displacement detection head is compensated by subtracting an output of the compensating detection section from an output of the main detection section.

In this case, the detected value of acceleration can be compensated by removing a noise component attributable to the ambient magnetic field from the magnetism that is directly detected by the main detection section of the magnet displacement detection head. Hence the inherent acceleration can be accurately detected.

It is preferable that the magnet displacement detection head includes a main detection section for detecting magnetism generated by the magnet, and a compensating detection section for detecting an ambient magnetic field acting on the magnet displacement detection head, the main detection section and the compensating detection section being arranged to be able to detect magnetism in the same axial direction such that an output signal of the magnet displacement detection head is compensated by subtracting a predetermined multiple of an output of the compensating detection section from an output of the main detection section.

In this case, the detected value of acceleration of the acceleration sensing parts can be compensated by removing a noise component attributable to the ambient magnetic field. To exactly speaking, the noise component attributable to the ambient magnetic field is given as the sum of noise caused by the ambient magnetic field directly acting on the magnet displacement detection head and noise caused by the magnet body being displaced due to the action of magnetic forces of the ambient magnetic field. The magnitude of total noise of those two kinds of noises can be expressed as a predetermined multiple of the magnitude of the ambient magnetic field. Accordingly, the output signal of the magnet displacement detection head is compensated by subtracting the predetermined multiple of the output of the compensating detection section from the output of the main detection section.

Hence the inherent acceleration can be more accurately detected.

It is preferable that the magnet displacement detection head is made of a differential magneto-impedance sensor element having one magneto-sensitive element, a first detection coil, and a second detection coil which are wound over the magneto-sensitive element, the first detection coil constituting a part of the main detection section, the second detection coil constituting a part of the compensating detection section, the first detection coil having one end connected to one end of the second detection coil, and wherein the first detection coil and the second detection coil are wound such that the coils generate output voltages of the same magnitude in opposed directions when a uniform magnetic field acts on the magneto-sensitive element.

Those features enable the magnet displacement detection head to have a smaller size and a simpler structure.

Further, as with the motion sensor, the detected value of acceleration can be compensated by removing a noise component attributable to the ambient magnetic field from the magnetism that is directly detected by the main detection section of the magnet displacement detection head. Hence the inherent acceleration can be accurately detected.

It is preferable that the magnet displacement detection head is made of a differential magneto-impedance sensor element comprising one magneto-sensitive element, a first detection coil, and a second detection coil which are wound over the magneto-sensitive element, the first detection coil constituting a part of the main detection section, the second detection coil constituting a part of the compensating detection section, the first detection coil having one end connected to one end of the second detection coil, and wherein the first detection coil and the second detection coil are wound such that the coils generate output voltages in opposed directions with the magnitude of an output voltage from one coil being a predetermined multiple of that from the other coil, when a uniform magnetic field acts on the magneto-sensitive element.

Those features also enable the magnet displacement detection head to have a smaller size and a simpler structure.

Further, as with the motion sensor, the detected value of acceleration of the acceleration sensing parts can be compensated by removing a noise component attributable to the ambient magnetic field. Hence the inherent acceleration can be more accurately detected.

It is preferable that the electronic circuit computes acceleration by executing computation to compensate influence of an ambient magnetic field based on respective outputs of the acceleration sensing parts and the magnetic sensing parts which are arranged such that magnetic sensing directions of the magnetic detection elements thereof are the same.

In this case, since the magnetic sensing parts are used to not only detect bearing and attitude, but also to compensate the detected value of acceleration, it is possible to reduce the number of parts, and to obtain a small and inexpensive motion sensor.

It is preferable that the electronic circuit controls the six magnetic detection elements with time-sharing.

In this case, the six magnetic detection elements can be efficiently controlled by using one electronic circuit. As a result, a small and inexpensive motion sensor can be obtained.

EMBODIMENTS

First Embodiment

A motion sensor according to a first embodiment of the present invention and a portable telephone using the motion sensor will be described below with reference to FIGS. 1-12. FIG. 1 is a schematic perspective view of the motion sensor.

Figure 2:
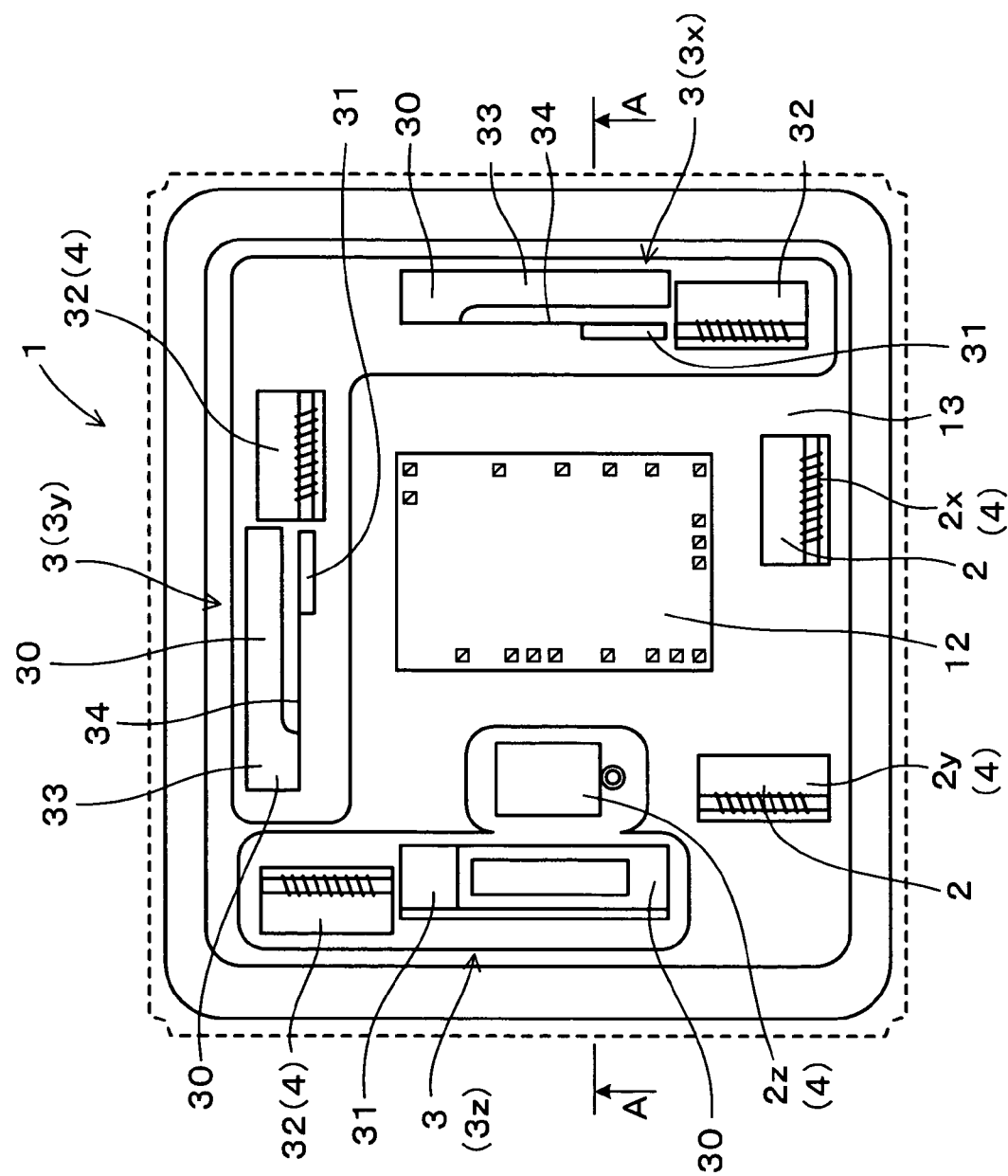
FIG. 2 is a plan view of the motion sensor according to the first embodiment.
Figure 3:
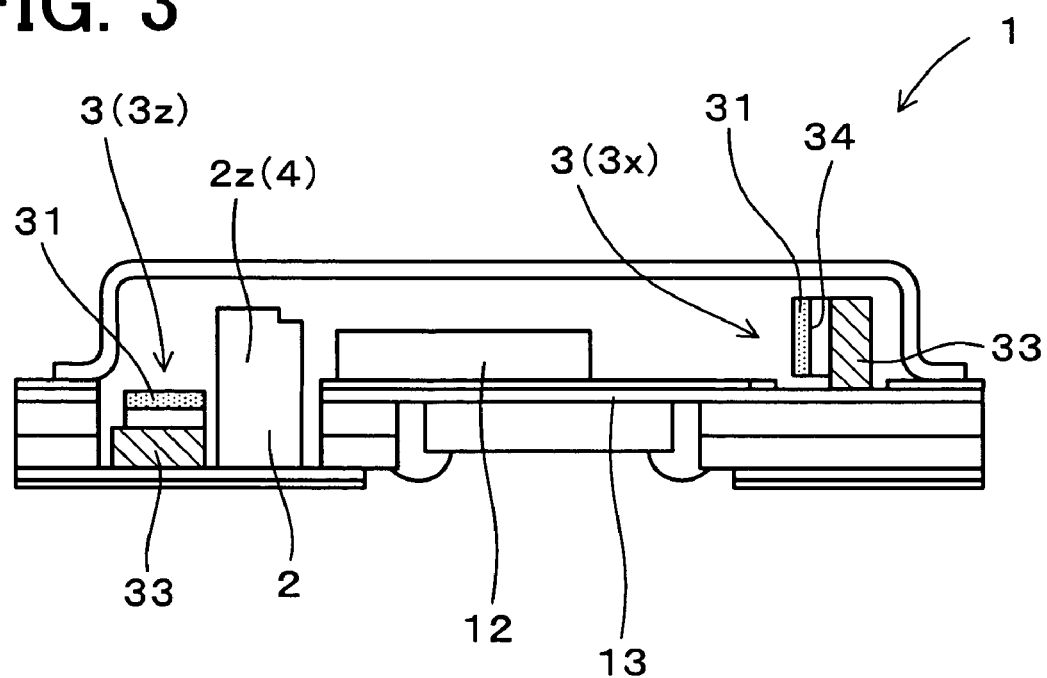
FIG. 3 is a sectional view taken along the line A-A in FIG. 2.

As shown in FIGS. 1-3, a motion sensor 1 of the first embodiment comprises three magnetic sensing parts 2 (2$x$, 2$y$ and 2$z$) for detecting magnetic field strength in 3-axis directions orthogonal to one another, and three acceleration sensing parts 3 (3$x$, 3$y$ and 3$z$) for detecting accelerations in the 3-axis directions.

Each of the acceleration sensing parts 3 comprises a magnet body 31 constituted to be able to displace depending on acceleration, and a magnet displacement detection head 32 for detecting a displacement of the magnet body 31.

The three magnetic sensing parts 2 and the three magnet displacement detection heads 32 are all made of the same type of magnetic detection elements 4 which operate based on common operation principles.

The motion sensor 1 is constituted in the form of a module obtained by integrating, into one package, one electronic circuit 12 (IC chip) for controlling a total of six magnetic detection elements 4, the three magnetic sensing parts 2, and the three acceleration sensing parts 3.

A cantilever 34 is fixed at its one end to a support post 33 fixedly provided in the package, and the magnet body 31 is fixed to the other end of the cantilever 34. The respective cantilevers 34 of the three acceleration sensing parts 3 are arranged with their longitudinal directions being parallel to the same plane, i.e., a flat surface of a base plate 13. In the following description, as shown in FIG. 1, it is assumed that axes extending along two orthogonal sides of the base plate 13 are X- and Y-axes, and an axis extending in the direction normal to the base plate 13 is a Z-axis.

The cantilevers 34 of the three acceleration sensing parts 3 are arranged such that they are able to bend in the 3-axis directions orthogonal to one another.

More specifically, the cantilever 34 of the acceleration sensing part 3$x$ for detecting acceleration in the X-axis direction is arranged to be able to bend in the X-direction. The cantilever 34 of the acceleration sensing part 3y for detecting acceleration in the Y-axis direction is arranged to be able to bend in the Y-direction. The cantilever 34 of the acceleration sensing part 3z for detecting acceleration in the Z-axis direction is arranged to be able to bend in the Z-direction.

Further, the magnet displacement detection heads 32 are arranged to face respective free ends of the cantilevers 34.

Figure 4:
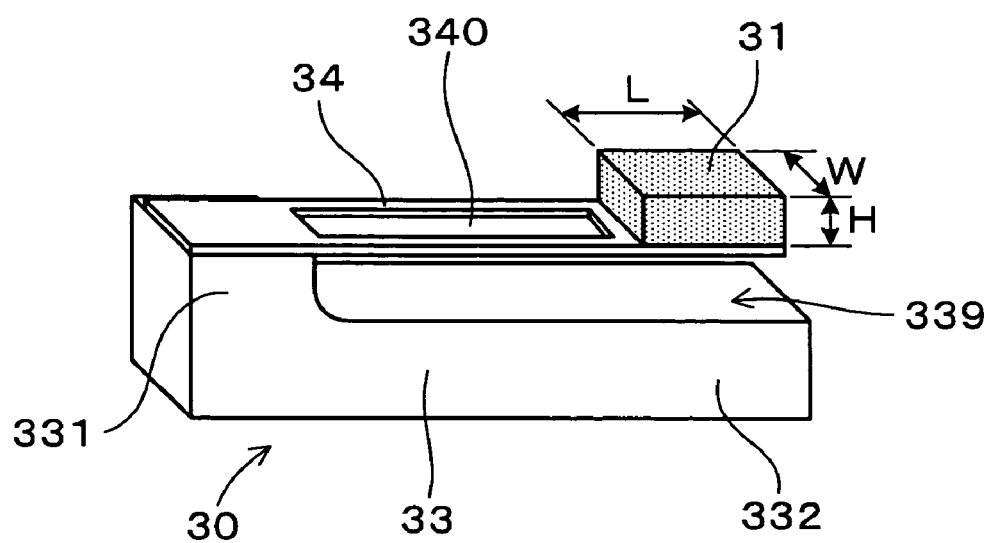
FIG. 4 is a perspective view of an acceleration sensing component in the first embodiment.

As shown in FIG. 4, each cantilever 34 is formed of an elastic material fixed at its one end to the support post 33. The cantilever 34 in this embodiment is made of Ni-P and is in the shape of a rectangular plate having a width of 0.3 mm, a length of 1.5 mm and a thickness of 5 μm. Further, in this embodiment, an elongated hole 340 having a width of 0.22 mm is formed in the cantilever 34 to extend from a position near a root portion fixed to the support post 33 to a position 0.38 mm inward of the free end so that the rigidity of the cantilever 34 against a force acting in the direction of thickness is reduced to enlarge the displacement of the magnet body 31.

In this embodiment, with the formation of the elongated hole 340, the natural frequency of the cantilever 34 is set to the range of equal to or more than 50 Hz to less than or equal to 60 Hz. Alternatively, a cantilever in the form of a flat plate not having the elongated hole 340 can also be employed.

The magnet body 31 is disposed at the other end, i.e., the free end, of the cantilever 34. In this embodiment, the magnet body 31 is formed by coating a magnetic material on a lateral surface of the free end, drying and hardening the magnetic material, and finally magnetizing the magnetic material.

With bending of the cantilever 34, the free end of the cantilever 34 is displaced to move in an angularly changing way, whereupon the magnet body 31 is displaced. The bending of the cantilever 34 and the displacement of the free end are slight. For example, the displacement of the free end of the cantilever 34 is not larger than about ⅒ of the length of the cantilever 34.

The support post 33 supporting the fixed end of the cantilever 34 is formed to have substantially an L-shape in cross-section.

Figure 5:
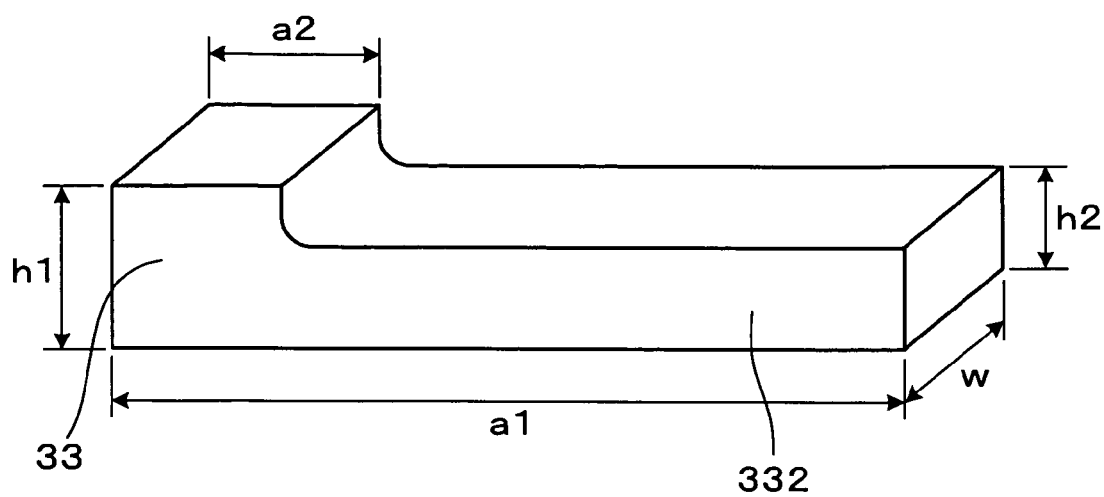
FIG. 5 is a perspective view of a support member in the first embodiment.
Figure 6:
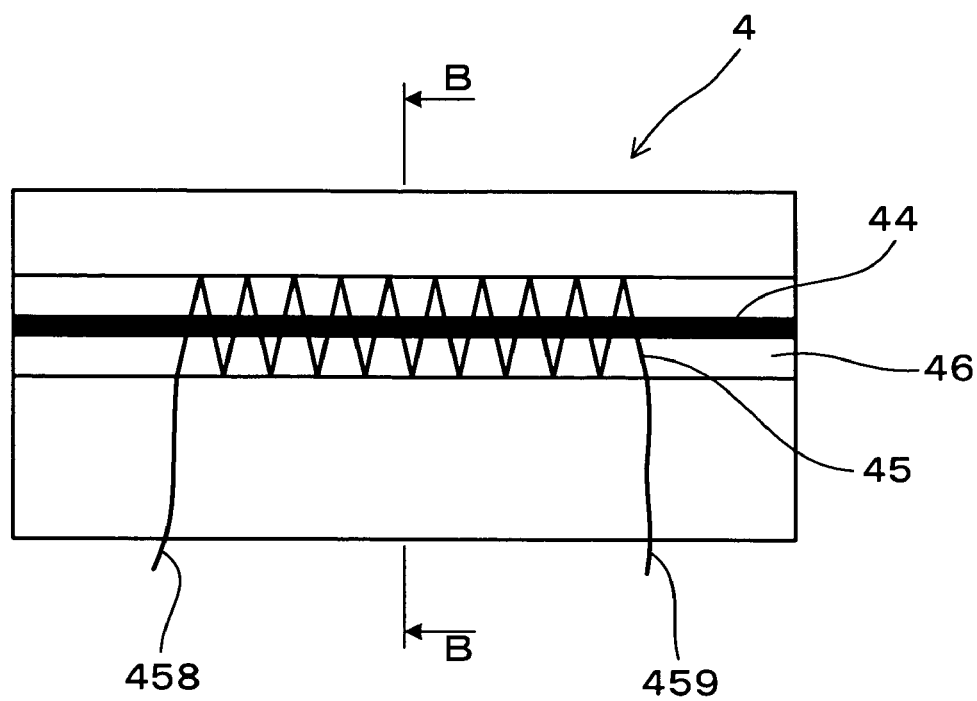
FIG. 6 is a front view of a magnetic detection element in the first embodiment.

More specifically, as shown in FIGS. 4 and 5, the support post 33 comprises a base portion 331 to which is joined the fixed end of the cantilever 34, and an extended portion 332 which is extended from the base portion 331 toward the free end of the cantilever 34 while leaving a gap 339 between the cantilever 34. The magnet body 31 is disposed at the free end of the cantilever 34 on its surface away from the gap 339.

The support post 33, the cantilever 34, and the magnet body 31 are joined together to constitute an acceleration sensing component 30 shown in FIG. 4.

As shown in FIG. 5, dimensions of the support post 33 can be set, for example, such that a width w is 0.6 mm and a length a1 is 2.0 mm. Also, a height h1 of the base portion 331 is 0.4 mm, a height h2 of the extended portion 332 is 0.3 mm, and a length a2 of the base portion 331 is 0.4 mm.

Further, as shown in FIG. 4, dimensions of the magnet body 31 can be set, for example, such that a length L is 0.2-0.6 mm, a width W is 0.2-0.8 mm, and a height H is 0.05-0.2 mm. Here, the length L means a length measured in a direction toward the free end from the fixed end of the cantilever 34. The width W means a length measured in a direction perpendicular to the direction of the length L and parallel to the surface of the cantilever 34. The height H means a length measured in the direction perpendicular to the surface of the cantilever 34.

On both sides of the free end of the cantilever 34 in the bending direction, stoppers (not shown) may be disposed to prevent excessive displacement of the cantilever 34. The support post 33 and the stoppers can be made of, e.g., Si (silicon).

The magnetic detection elements 4 constituting the three magnetic sensing parts 2 and the magnetic detection elements 4 constituting the three magnet displacement detection head 32 are each made of a magneto-impedance sensor element.

As shown in FIGS. 6-9, the magneto-impedance sensor element (magnetic detection element 4) comprises a magneto-sensitive element 44 and a detection coil 45 wound around the magneto-sensitive element 44. The magneto-sensitive element 44 penetrates through an insulator 46, and the detection coil 45 is disposed over an outer peripheral surface of the insulator 46.

An amorphous wire made of a $Co_{68.1}Fe_{4.4}Si_{12.5}B_{15.0}$ alloy and having a length of 1.0 mm and a wire diameter of 20 μm is used as the magneto-sensitive element 44. An epoxy resin is used as the insulator 46.

The magneto-impedance sensor element performs magnetic sensing by utilizing the so-called MI (Magneto-Impedance) effect that, in response to change of a current supplied to the magneto-sensitive element 44, an induced voltage is caused in the detection coil 45 depending on the magnitude of a magnetic field acting upon the element. The MI effect occurs in the magneto-sensitive element 44 composed of a magnetic material in which electron spins are aligned in a rotational direction around direction of that a supplied current flows. If the current flowing through the magneto-sensitive element 44 is abruptly changed, an abrupt change in the magnetic field in the rotational direction occurs, which causes a change in the electron spin direction depending on an ambient magnetic field. On that occasion, effect of a change in internal magnetization and a change in impedance or the like occurred in the magneto-sensitive element at that time is the above MI effect.

The term "ambient magnetic field" used in explaining the magneto-impedance sensor element and the MI effect includes not only the so-called ambient magnetic field such as the geomagnetism, but also the magnetic field generated by the magnet body 31.

The magneto-impedance sensor element (magnetic detection elements 4) is configured to be able to detect magnetic field strength by detecting an induced voltage generated between two ends of the detection coil 45 thereof when the current flowing through the magneto-sensitive element 44 rises up or falls down at a rate equal to or less than 10 nsec.

Thus, such an abrupt change in the flowing current causes the magnetic field in the rotational direction around the magneto-sensitive element 44 to change at a high rate corresponding to a velocity at which the change in the electron spin propagates, and thus a sufficiently high MI effect can be obtained.

When the flowing current is risen or fallen at a rate equal to or less than 10 nsec, the magneto-sensitive element 44 receives a current change of flow including a high-frequency component of about 0.1 GHz. By detecting the voltage induced at both ends of the detection coil, it is possible to detect a change in internal magnetization depending on an ambient magnetic field as the size of the induced voltage, and thus it is possible to detect the strength of the ambient magnetic field with very high accuracy. The rising or the falling of the flowing current is defined by changing the current flowing through the magneto-sensitive element 44 from lower than or equal to 10% (equal to or higher than 90%) or from equal to or higher than 90% (lower than or equal to 10%) of the steady-state current, for example.

It is preferable that magneto-impedance sensor element detect a voltage induced between both ends of the detection coil 45 when the current flowing through the magneto-sensitive element 44 falls down.

Better linearity concerning the magnetic field strength vs. output signal of the magneto-impedance sensor element is obtained in the case in which the induced voltage is detected when the flowing current falls down abruptly than in the case in which the induced voltage is detected when the flowing current rises up.

In this embodiment, the magnetic field strength is detected by measuring an induced voltage e (FIG. 11B) generated between electrodes 458 and 459 at both ends of the detection coil 45 when a current in the pulsed form shown in FIG. 11A (hereinafter referred to as a "pulse current" for convenience) is supplied to the magneto-sensitive element 44.

Figure 11A:
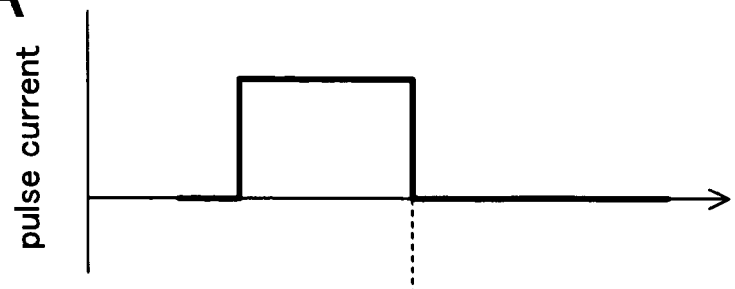
FIGS. 11A and 11B are charts showing the relationship between a pulse current passed through a magneto-sensitive element and a voltage induced in the detection coil in the first embodiment.
Figure 11B:
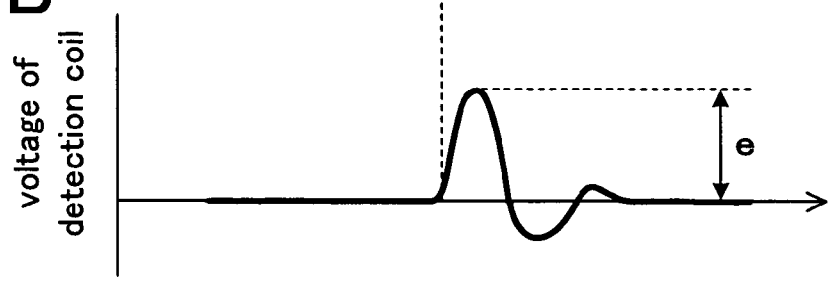

Thus, according to the magnetic detection method in this embodiment, as shown in FIGS. 11A and 11B, the induced voltage e (FIG. 11B) generated in the detection coil 45 is measured at a fall of the pulse current (FIG. 11A) supplied to the magneto-sensitive element 44.

Figure 7:
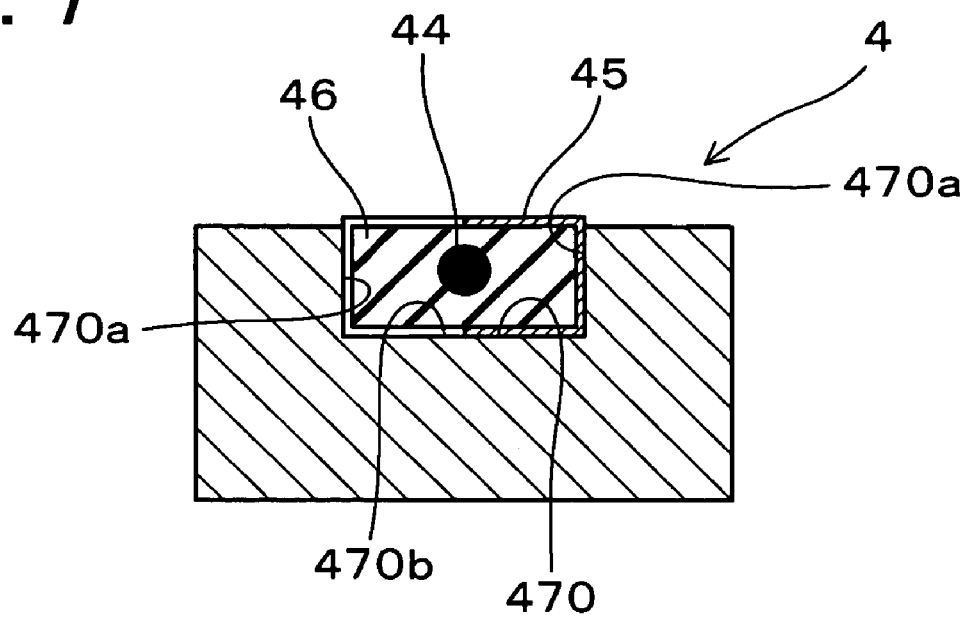
FIG. 7 is a sectional view taken along the line B-B in FIG. 6.
Figure 8:
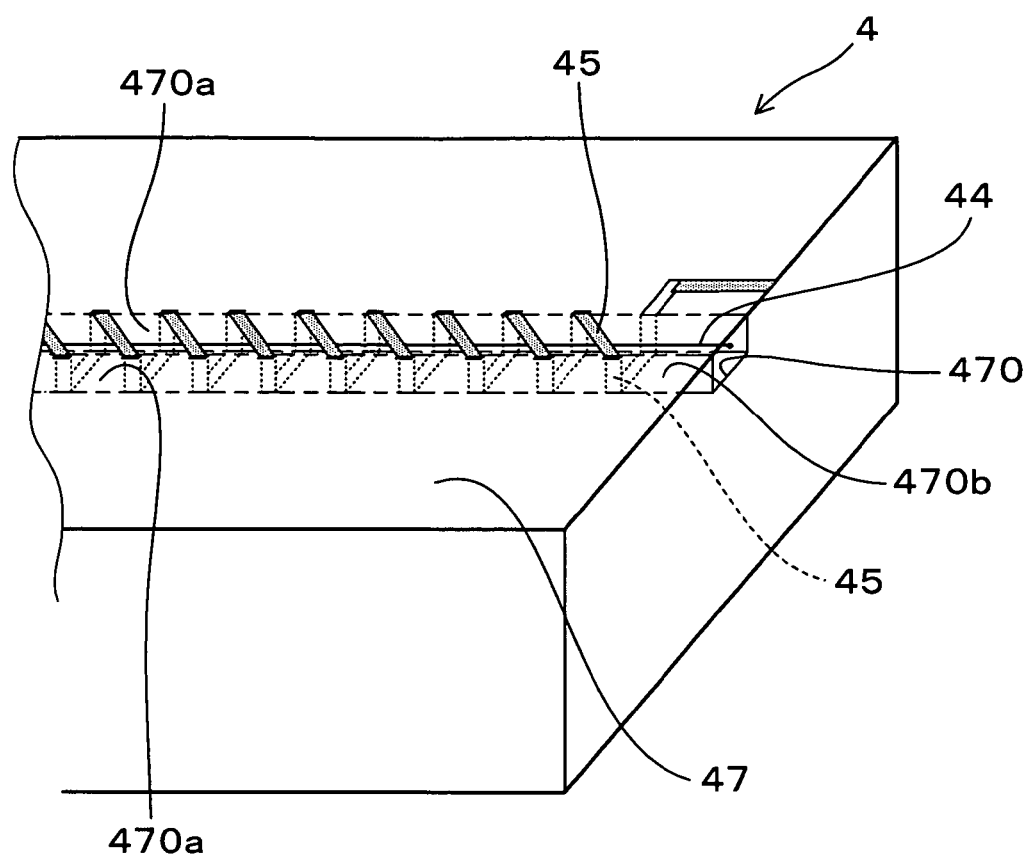
FIG. 8 is a partial perspective view for explaining the magnetic detection element in the first embodiment.
Figure 9:
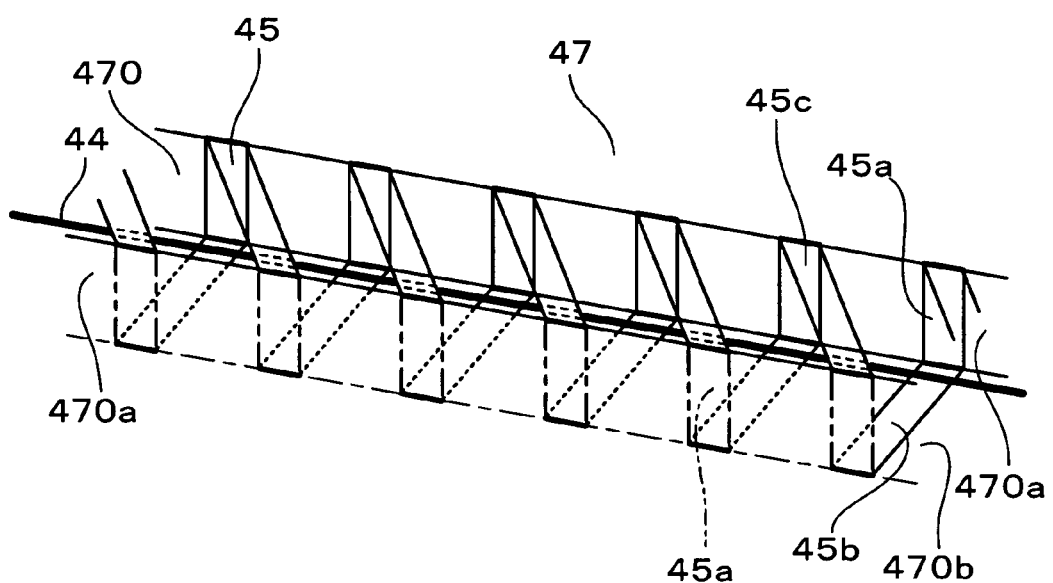
FIG. 9 is a perspective view for explaining a detection coil in the first embodiment.

As shown in FIG. 7, the magneto-impedance sensor element is formed on an element substrate having a groove-shaped recess 470 that is 5 to 200 μm in depth and rectangular in cross section. As shown in FIGS. 8 and 9, on each of the groove lateral surfaces 470a facing each other in the inside of the recess 470, a plurality of conductive patterns 45a extending in the direction of groove depth are formed at regular intervals. Further, on the bottom surface 470b of the recess 470, a plurality of conductive patterns 45b electrically connecting to conductive patterns 45a at positions of the same pitch are formed to extend in a direction slightly with respect to the direction of groove width.

As shown in FIGS. 6-9, the magneto-sensitive element 44 is embedded in an insulator 46 made of epoxy filled in the inside of the recess 470 having the conductive patterns 45a and 45b formed on the groove lateral surfaces 470a and the bottom surface 470b. On the outer surface of the insulator 46 filled in the recess 470, a plurality of conductive patterns 45c electrically connecting to conductive patterns 45a which are disposed at positions shifted by one pitch on the opposed groove lateral surfaces 470a are disposed to extend in a direction slightly inclined with respect to the direction of groove width.

The conductive patterns 45a, 45b and 45c are interconnected into a continuous pattern in such a manner, whereby the spirally wound detection coil 45 is formed.

One example of a method of forming the detection coil 45 is as follows. Thus, the conductive patterns 45a and 45b are formed by depositing a conductive thin metal film over the entire inner surfaces 470a and 470b of the recess 470 and then patterning the deposited thin metal film by means of etching. The conductive patterns 45c are formed by evaporating a conductive thin metal film (not shown in the figure) on the entire surface of the insulator 46 and then etching the conductive thin metal film.

The effective inner diameter of the detection coil 45 is 66 μm corresponding to the inner diameter of a circle having the same area as the area of the cross section of the recess 470. The line width and the line interval of the detection coil 45 are each set to 25 μm. Note that, in FIGS. 8 and 9, the line interval is shown in enlarged scale for convenience of illustration.

Figure 10:
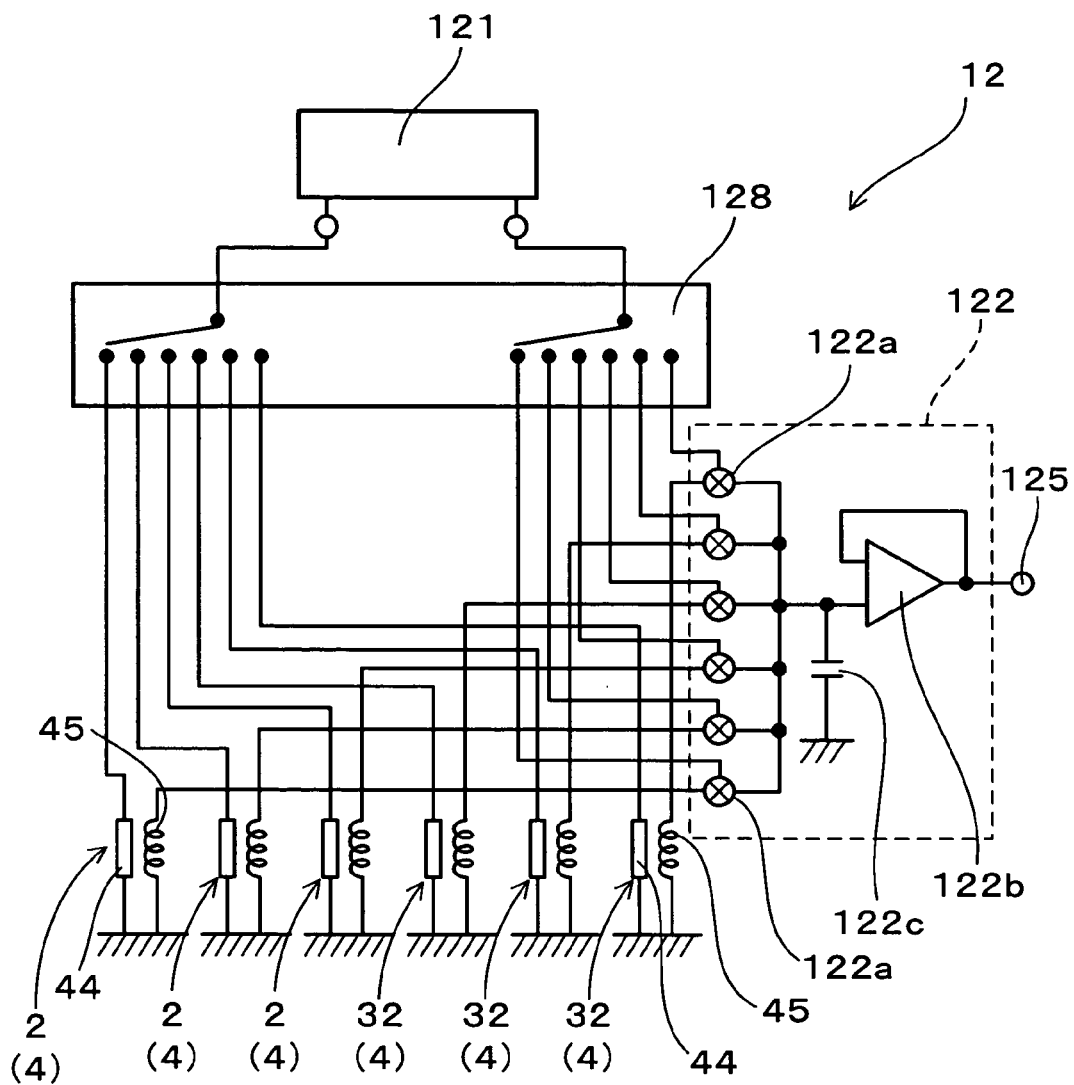
FIG. 10 is a circuit diagram of an electronic circuit in the first embodiment, which is shared by six magnetic detection elements.

The electronic circuit 12 for controlling six magnetic detection elements 4 has an electronic circuit including, as shown in FIG. 10, a signal generator 121 that generates a pulse current input to the magneto-sensitive element 44 and a signal processor 122 that outputs a measurement signal according to the induced voltage e (FIG. 11B) of the detection coil 45. The signal generator 121 generates a pulse current with a width of 40 nsec at intervals of 5 msec. Further, the signal generator 121 of this example also outputs a trigger signal in synchronization with a falling edge of each pulse current to an analog switch 122a of the signal processor 122.

The signal processor 122 is composed of combination of a synchronous detector circuit which functions as a so-called "peak hold" circuit and an amplifier 122b. The synchronous detector circuit includes an analog switch 122a which turns on and off the electric connection between the detection coil 45 and the signal processor 122 in synchronization with the trigger signal and also includes a capacitor 122c connected to the detection coil 45 via the analog switch 122a.

The electronic circuit 12 further comprises an electronic switch 128 for switching over electrical paths between the signal generator 121 and the respective magneto-sensitive elements 44 of the magnetic detection elements 4, and electrical paths between the signal processor 122 and the detection coils 45. With such an arrangement, the electronic circuit 12 is shared with time-sharing by switching over a total of six magnetic detection elements 4 per 2 ms, i.e., the three magnetic detection elements 4 for measuring the intensities of the magnetic fields in the X-, Y- and Z-axes (see FIG. 1) (i.e., the three magnetic sensing parts 2) and the three magnetic detection elements 4 for measuring the magnitudes of acceleration in the X-, Y- and Z-axes (i.e., the three magnet displacement detection heads 32). The switching interval is set to 2 ms, by way of example, and it may be shorter or longer than 2 ms.

A method of detecting a magnetic field using the magnetic detection element 4 is briefly described below. In this magnetic field detection method, as shown in FIGS. 11A and 11B, when the pulse current passed through the magneto-sensitive element 44 falls down (FIG. 11A), the induced voltage e (FIG. 11B) generated in the detection coil 45 is measured. In the present example, the turn-off time, defined by a time needed for the pulse current to fall down from 90% of the steady-state value (150 mA) to 10% of the steady-state value, is set to be equal to 4 nsec.

That is, as shown in FIGS. 11A and 11B, at the moment when the pulse current flowing through the magneto-sensitive element 44 placed into the magnetic field is turned off, an induced voltage e with a magnitude proportional to a magnetic field component in the longitudinal direction of the magneto-sensitive element 44 is generated between the two ends of the detection coil 45. In the electronic circuit 12 of this example, the induced voltage e between the detection coil 45 is stored in the capacitor 122c via the analog switch 122a turned on by the trigger signal, is amplified by the amplifier 122b, and is output via an output terminal 125.

As described above, each of the magnetic detection element 4 outputs, via the electronic circuit 12, a signal corresponding to the intensity of the magnetic field component in the longitudinal direction of the magneto-sensitive element 44.

As described above, each magnetic detection element 4 in this embodiment sends the output signal corresponding to the magnetic field strength acting in the longitudinal direction of the magneto-sensitive element 44 to the exterior from the electronic circuit 12.

The operation and effect of this embodiment will be described below.

Since the motion sensor 1 includes the three magnetic sensing parts 2 and the three acceleration sensing parts 3, it is possible to three-dimensionally detect the bearing, attitude and acceleration (direction and magnitude) of an object to which is mounted the motion sensor 1.

More specifically, since the magnetic sensing parts 2 detect the geomagnetism and the acceleration sensing parts 3 detect the acceleration of gravity, the bearing and attitude of the object can be detected. Further, since the magnetic sensing parts 2 and the acceleration sensing parts 3 are disposed three for each type of the parts to lie in the 3-axis directions, the bearing and attitude of the object can be detected three-dimensionally. Here, the term "attitude" means, e.g., absolute angles and relative angles of pitch, yaw and roll of the object.

In addition, the provision of the three acceleration sensing parts 3 enables the direction and magnitude of acceleration to be detected in any of three-dimensional directions.

The three magnetic sensing parts 2 and the three magnet displacement detection heads 32 are all made of the same type of magnetic detection elements 4 which operate based on the common operation principles. Therefore, electronic circuits for controlling the magnetic detection elements 4 can be operated based on the same principles, and the number of required electronic circuits can be reduced to just one, i.e., the electronic circuit 12. As a result, the motion sensor 1 can be easily simplified and downsized.

Moreover, since the motion sensor 1 is constituted in the form of a module obtained by integrating the one electronic circuit 12, the three magnetic sensing parts 2, and the three acceleration sensing parts 3 into one package, the motion sensor 1 can be more easily simplified and downsized.

Since the motion sensor 1 includes the three magnetic sensing parts 2 for detecting the magnetic field strength in respective direction along 3-axis perpendicular to each other and the three acceleration sensing parts 3 for detecting the accelerations in the 3-axis directions, it is possible to easily compensate the influence of an ambient magnetic field upon the acceleration sensing parts 3. More specifically, the ambient magnetic field, e.g., the geomagnetism, other than the magnetism generated by the magnet body 31 may act on the magnet displacement detection heads 32 of the acceleration sensing parts 3, or the magnet body 31 may be displaced due to the action of magnetic forces of the ambient magnetic field in some cases. Using output values of the three magnetic sensing parts 2 enables compensation of errors in the values of accelerations detected by the acceleration sensing parts 3, which are attributable to the ambient magnetic field acting on the magnet displacement detection heads 32 and the displacement of the magnet body 31 due to the action of magnetic forces of the ambient magnetic field.

Further, the magnetic sensing parts 2 are disposed three in directions corresponding to the acceleration sensing parts 3 and are made of the same type of magnetic detection elements 4 which operate based on the operation principles common to the magnet displacement detection heads 32 of the acceleration sensing parts 3. Accordingly, the compensation of the above-mentioned errors in the detected values of accelerations can be performed with ease. In addition, since the magnetic sensing parts 2 are integrated into one modular package together with the acceleration sensing parts 3 and both the parts are disposed close to each other, high accuracy is ensured in the compensation of the errors.

The cantilevers 34 of the three acceleration sensing parts 3 are disposed such that their longitudinal directions are parallel to the same plane. Therefore, the motion sensor 1 having a small size and a thin thickness can be easily obtained. As a result, the motion sensor 1 can be mounted on small equipment and thin equipment as well.

Since the magnetic detection elements 4 constituting the three magnetic sensing parts 2 and the magnetic detection elements 4 constituting the three magnet displacement detection heads 32 are each made of a magneto-impedance sensor element, the motion sensor 1 having high accuracy and a small size can be easily obtained.

More specifically, the magneto-impedance sensor element has so high sensitivity that it can detect the weak geomagnetism with high accuracy and can detect a small displacement of the magnet body 31 with high accuracy. Also, since the magneto-impedance sensor element is small in size, the motion sensor 1 can be realized with a smaller size.

As described above, the magnetic sensing parts 2 and the magnet displacement detection heads 32 in this embodiment are made of the magnetic detection elements 4 having the same specifications. In particular, the longitudinal directions of the magneto-sensitive elements 44 are coincident with each other between the magnet displacement detection heads 32 of the acceleration sensing parts 3x, 3z and the magnetic sensing part 2y and between the magnet displacement detection head 32 of the acceleration sensing part 3y and the magnetic sensing part 2x.

With such an arrangement, the detection coils 45 wound over the magneto-sensitive elements 44 in the magnetic sensing parts 2 and the detection coils 45 wound over the magneto-sensitive elements 44 in the magnet displacement detection heads 32, which are identical with each other in their longitudinal directions, output the induced voltages having the same magnitude depending on the ambient magnetic field such as the geomagnetism.

Thus, when the correction in which the signal output of the magnetic sensing part 2y subtracted from the signal output of the magnet displacement detection head 32 of the acceleration sensing part 3x is conducted, the influence by the ambient magnetic field is excluded from the signal output of the acceleration sensing part 3x, and thus the detection accuracy is improved.

More specifically, the signal Hs output from the magnet displacement detection head 32 of the acceleration sensing part 3x is given by the sum of the quantity of magnetism $k_1 H_\alpha$ corresponding to an acceleration $\alpha$ and a component He of geomagnetism in the Y direction (same as the direction in which the magnet displacement detection head 32 has sensitivity). That is, the signal Hs can be expressed as follows.

$$Hs = k_1 H_\alpha + k_2 He \quad (1)$$

The signal H's output from the magnetic sensing part 2y with the same direction as that of the above magnet displacement detection head 32 can be expressed as follows.

$$H's = k_3 He \quad (2)$$

When k2=k3, if H's given by equation (2) is subtracted from Hs given by equation (1), then the result is $$Hs - H's = k_1 H_\alpha \quad (3)$$

Thus, a noise component caused by the geomagnetism is removed.

In equations (1) to (3), $k_1$, $k_2$ and $k_3$ are coefficients associated with quantity of magnetism.

The signal output from the acceleration sensing parts 3y and 3z can also be corrected in a similar manner.

Since the electronic circuit 12 is constituted so as to control the six magnetic detection elements 4 with time-sharing, the six magnetic detection elements 4 can be efficiently controlled by using the one electronic circuit 12.

More specifically, as shown in FIGS. 10 and 12, the six magnetic detection elements 4, i.e., the three magnetic sensing parts 2 and the three magnet displacement detection heads 32, can be controlled by using the one electronic circuit 12 having 6 channels of selector switches (i.e., the electronic switch 128) with time-sharing.

In this configuration, the single electronic circuit 12 is shared by the three magnetic sensing parts 2 and the three magnet displacement detection heads 32, and thus a further reduction in the total size of the attitude motion sensor 1 can be easily achieved, and a reduction in power consumption is also achieved.

If connection parts for the connection between the magnetic detection elements 4 and the main part of the electronic circuit are not taken into the count, the electronic circuit 12 includes a driver circuit for driving the magnetic detection elements, a signal detection circuit, a signal processing circuit, a signal transfer circuit, and a sensor power supply circuit. Instead of disposing electronic circuits 12 separately for the respective six magnetic detection elements 4, it is possible to dispose only one electronic circuit 12 that is switched via the electronic switching unit 128 such that the electronic circuit 12 for controlling the magnetic detection elements 4 is shared by the six magnetic detection elements 4. This allows a great reduction in the size of the electronic circuit 12, and thus a reduction in the total size of the motion sensor 1.

As described above, use of the single electronic circuit 12 including the 6-channel change-over switching unit to control the six magnetic detection elements 4 allows a reduction in the size of the motion sensor 1

As described above, when the magneto-impedance sensor elements are used as the magnetic detection elements 4 as in the present example, use of the change-over switching unit (electronic switching 128) is very effective. That is, because the magneto-impedance sensor element are excellent in output linearity and response, it is possible to achieve a good operation when the connection between the magneto-impedance sensor elements and the electronic circuit 12 is switched using the change-over switching unit.

According to the first embodiment, as described above, the motion sensor is obtained which can easily and accurately detect bearing, attitude and acceleration in any of three-dimensional directions.

Second Embodiment

This second embodiment represents a motion sensor in which, as shown in FIGS. 13-17, a magnetic detection element 40 serving as the magnet displacement detection head 32 includes a main detection section 41 for detecting the magnetism generated by a magnet body 31, and a compensating detection section 42 for detecting the ambient magnetic field acting on the magnet displacement detection head 32.

The main detection section 41 and the compensating detection section 42 are arranged to be able to detect the magnetism in the same axial direction. With such an arrangement, the output signal of the magnet displacement detection head 32 can be compensated by subtracting an output of the compensating detection section 42 from an output of the main detection section 41.

Figure 15:
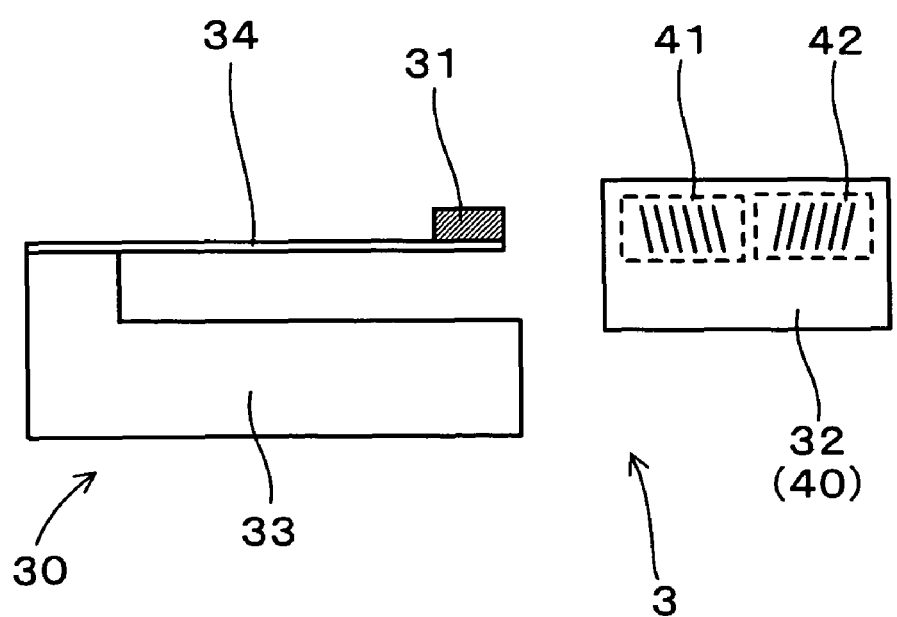
FIG. 15 is an explanatory view of an acceleration sensing part in the second embodiment.

As shown in FIG. 15, the magnet displacement detection head 32 is arranged such that the main detection section 41 is positioned to face the magnet body 31 of the acceleration sensing part 3.

Figure 13:
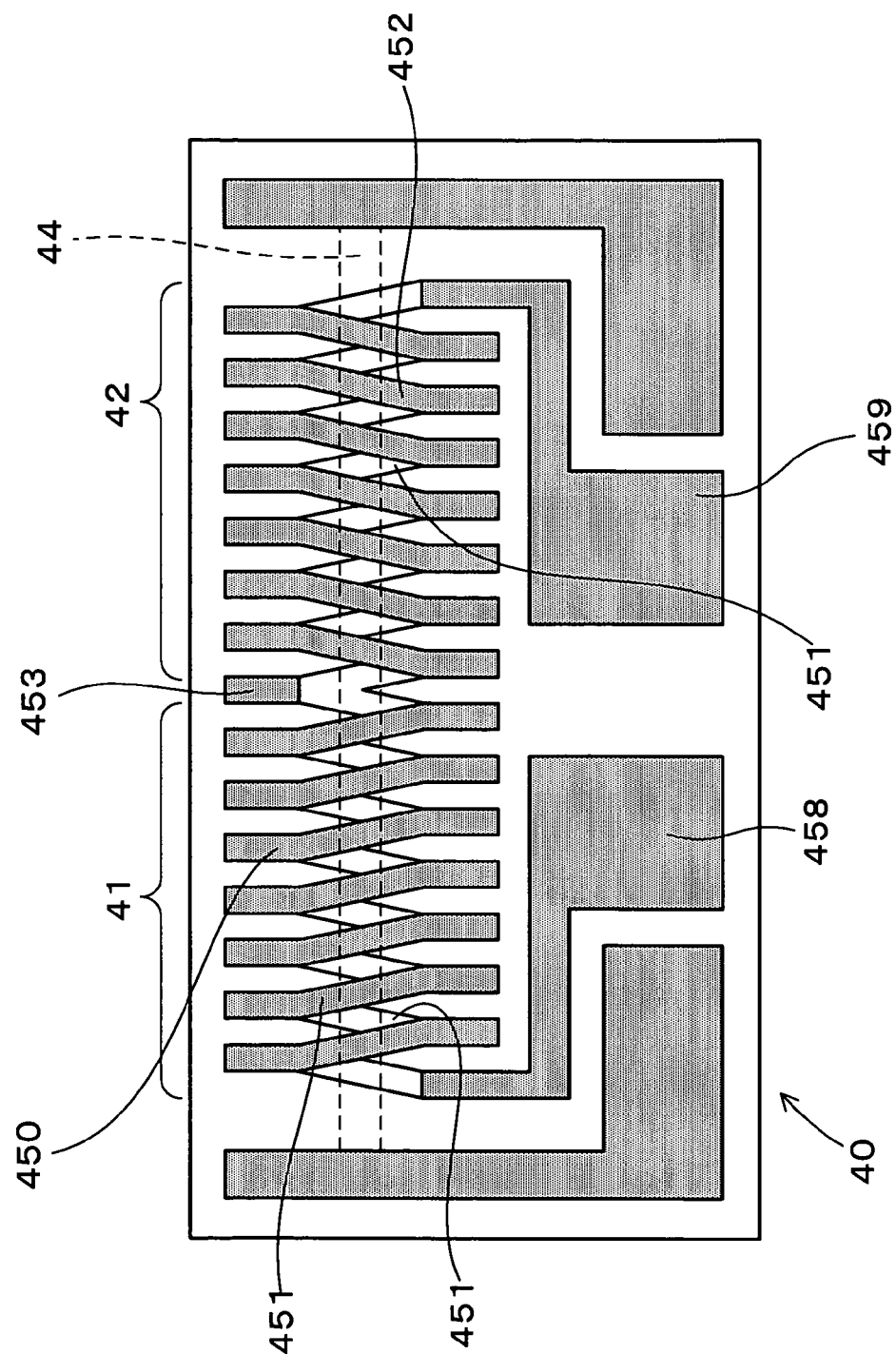
FIG. 13 is a plan view of a differential magneto-impedance sensor element in a second embodiment.
Figure 14:
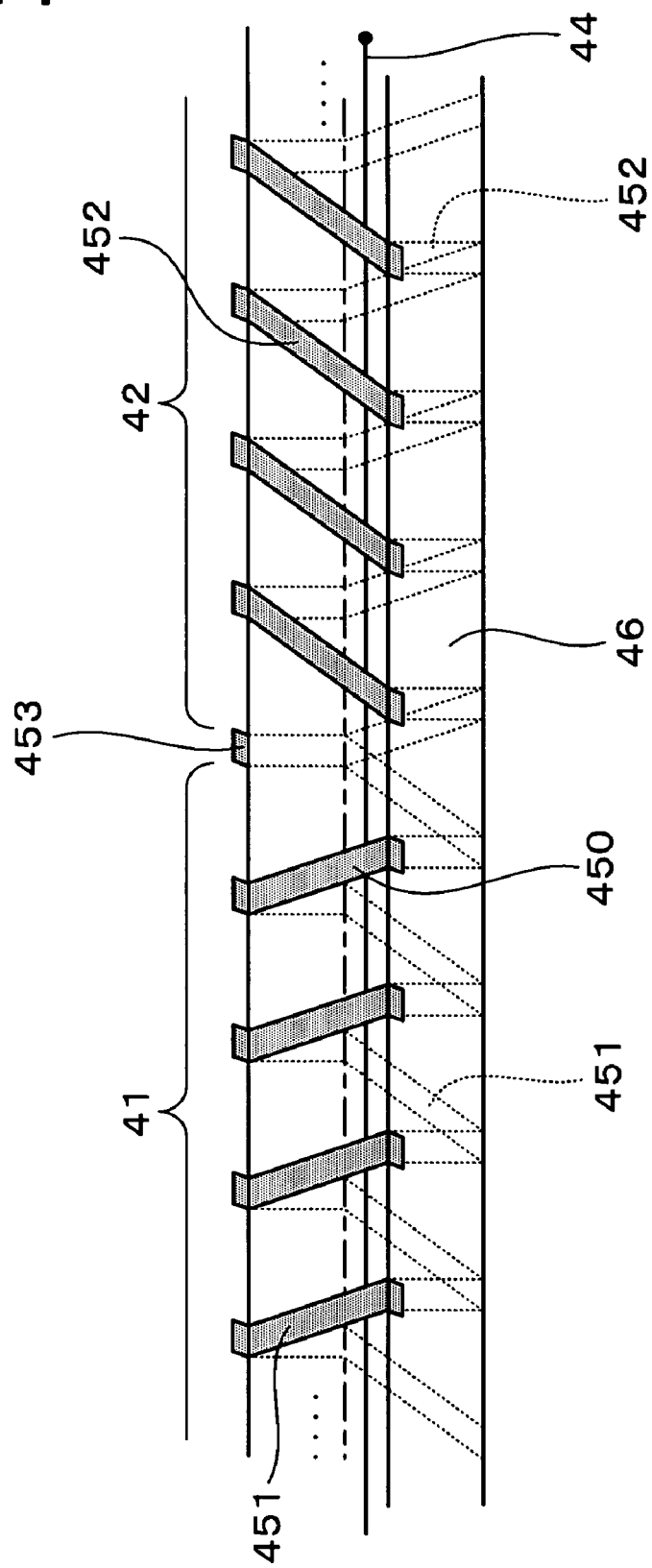
FIG. 14 is a partial perspective view of the magneto-impedance sensor element in the second embodiment.

As shown in FIGS. 13 and 14, the magnet displacement detection head 32 is made of a differential magneto-impedance sensor element comprising one magneto-sensitive element 44, a first detection coil 451, and a second detection coil 452, the coils 451 and 452 being wound over the magneto-sensitive element 44. The first detection coil 451 constitutes a part of the main detection section 41, and the second detection coil 452 constitutes a part of the compensating detection section 42. One end of the first detection coil 451 is connected to one end of the second detection coil 452. Furthermore, the first detection coil 451 and the second detection coil 452 are wound such that both the coils generate output voltages of the same magnitude in opposed directions when a uniform magnetic field acts on the magneto-sensitive element 44.

More specifically, as shown in FIGS. 13 and 14, the first detection coil 451 and the second detection coil 452 are wound in opposed directions. In other words, a connection point between the one end of the first detection coil 451 and the one end of the second detection coil 452 serves as a winding direction reversal point 453, and the coil winding direction is reversed on both sides of the winding direction reversal point 453. The first detection coil 451 and the second detection coil 452 are wound in such a manner that the main detection section 41 and the compensating detection section 42 generate output voltages in opposed directions when the same magnetic field acts on the main detection section 41 and the compensating detection section 42.

The magnetic detection element 40 in this second embodiment has basically the same construction as that of the magnetic detection elements 4 in the first embodiment. As shown in FIGS. 13 and 14, however, the first detection coil 451 and the second detection coil 452 are wound such that the coil winding direction is reversed on both sides of the winding direction reversal point 453.

Figure 17A:
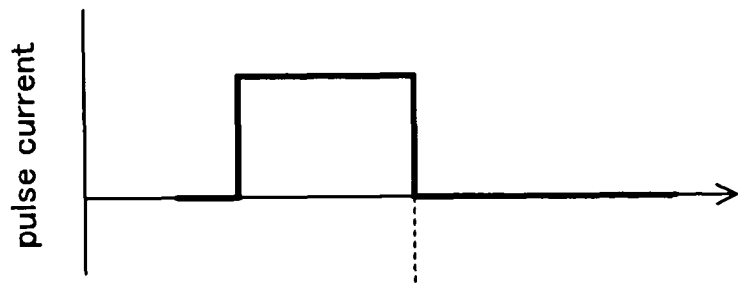
FIGS. 17A and 17B are charts showing the relationship between a pulse current passed through a magneto-sensitive element and a voltage induced in a detection coil in the second embodiment.

Also, as in the first embodiment, the magnetic detection element 40 detects a difference in magnetic field strength between the main detection section 41 and the compensating detection section 42 by measuring an induced voltage e (FIG. 17B) generated between electrodes 458 and 459 at both ends of a detection coil 450, which comprises the first detection coil 451 and the second detection coil 452, when a pulse current shown in FIG. 17A is supplied to the magneto-sensitive element 44.

Figure 17B:
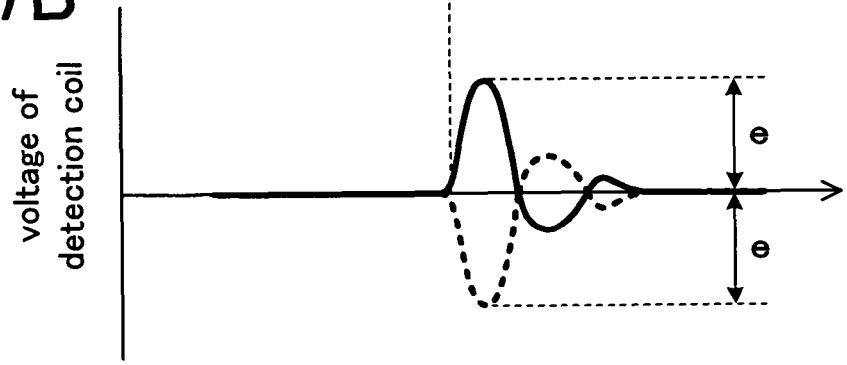

In FIG. 17B, a solid line curve and a broken line curve represent respective output voltages generated in the first detection coil 451 and the second detection coil 452 when a uniform magnetic field acts on those coils.

Further, the magnetic detection element 4 is constituted such that, when there occurs a difference between components of the magnetic fields acting on the main detection section 41 and the compensating detection section 42 in the axial direction of the magneto-sensitive element 44, a potential difference is caused between the electrodes 458 and 459 at both ends of the detection coil 450 comprising the first detection coil 451 and the second detection coil 452 which are formed in continuous winding.

Stated another way, the magnetic detection element 40 is formed such that the main detection section 41 and the compensating detection section 42 are arranged in a symmetric state, and that when the same magnetic field acts on the main detection section 41 and the compensating detection section 42, no potential difference is caused between the electrodes 458 and 459 at both ends of the continuously formed detection coil 450.

Figure 16:
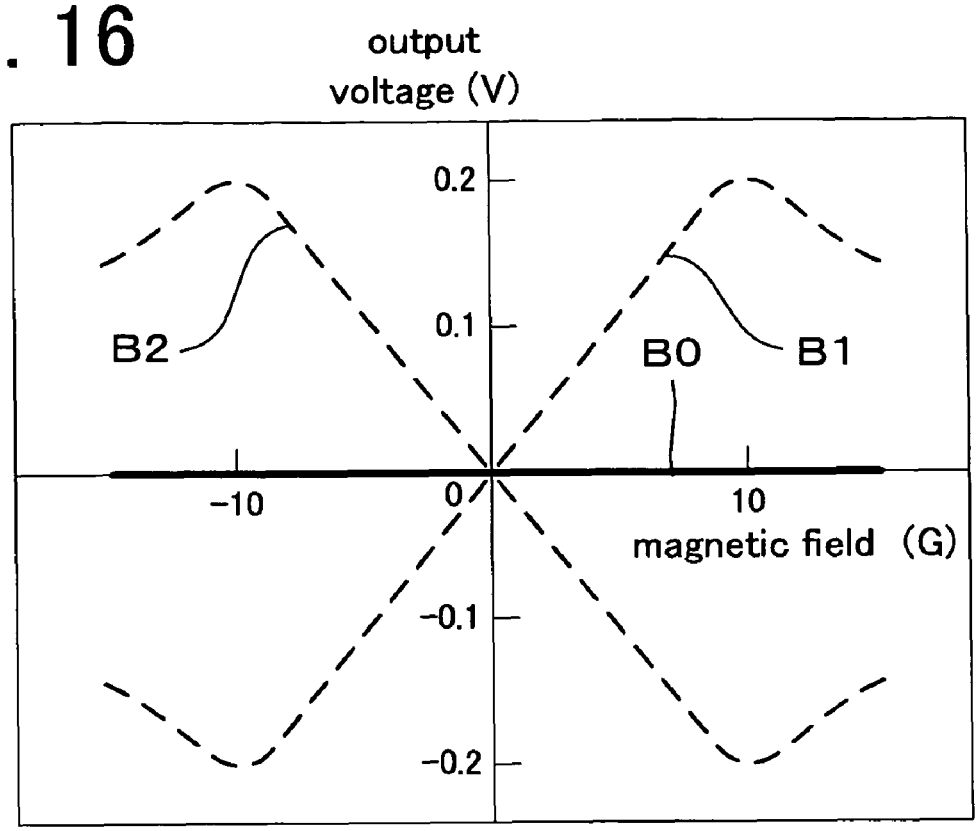
FIG. 16 is a graph showing the relationship between an ambient magnetic field and an output voltage of the magneto-impedance sensor element in the second embodiment.

More specifically, as indicated by broken lines B1 and B2 in FIG. 16, when the ambient magnetic field similarly acts on the main detection section 41 and the compensating detection section 42, output voltages having the same magnitude, but having signs opposed to each other are generated. Those output voltages (B1, B2) are voltages generated respectively between the electrode 458 and the winding direction reversal point 453 and between the winding direction reversal point 453 and the electrode 459.

However, because the one end of the first detection coil 451 of the main detection section 41 and the one end of the second detection coil 452 of the compensating detection section 42 are interconnected at the winding direction reversal point 453 as shown in FIGS. 13 and 14, the above two output voltages are cancelled each other. Eventually, no output voltage is generated in the entirety of the magnetic detection elements 4 as indicated by a solid line B0 in FIG. 16.

When there occurs a difference between the components of the magnetic fields acting on the main detection section 41 and the compensating detection section 42 in the axial direction of the magneto-sensitive element 44, a potential difference is caused between the electrodes 458 and 459 at both ends of the detection coil 450 shown in FIG. 13. In other words, the magnetic field generated by the magnet body 31 of the acceleration sensing part 3, i.e., the magnetic field to be measured, acts as the magnetic field other than the ambient magnetic field on only the main detection section 41, thus causing a potential difference between the electrodes 458 and 459 at both ends of the detection coil 450 in the magnetic detection element 40.

The magnetic sensing part 2 is made of the magnetic detection element 4, i.e., the same one as that used in the first embodiment.

The other construction is similar to that in the first embodiment.

According to the second embodiment, the detected value of acceleration can be compensated by removing a noise component attributable to the ambient magnetic field from the magnetism that is directly detected by the main detection section 41 of the magnet displacement detection head 32. Hence the inherent acceleration can be accurately detected.

Using the above-described differential magneto-impedance sensor element enables the magnet displacement detection head 32 to have a smaller size and a simpler structure.

In addition, the second embodiment can also provide similar advantages to those in the first embodiment.

Third Embodiment

This third embodiment represents a motion sensor in which the output signal of the magnet displacement detection head 32 is compensated by subtracting a predetermined multiple of the output of the compensating detection section 42 from the output of the main detection section 41.

The first detection coil 451 and the second detection coil 452 of the magnet displacement detection head 32 are wound such that both coils generate output voltages in opposed directions with the magnitude of the output voltage from one coil being a predetermined multiple of that from the other coil, when a uniform magnetic field acts on the magneto-sensitive element 44.

Practically, the number of windings of the second detection coil 452 is set to be a predetermined multiple of the number of windings of the first detection coil 451.

Stated another way, the magnetic detection element 40 is formed such that the main detection section 41 and the compensating detection section 42 are arranged in an asymmetric state, and that when the magnetic field acting on the main detection section 41 and the magnetic field acting on the compensating detection section 42 are at a certain ratio, no potential difference is caused between the electrodes 458 and 459 at both ends of the continuously formed detection coil 450.

Thus, in order to remove noise caused by the magnet body 31 being displaced due to the ambient magnetic field acting on the magnet body 31 of the acceleration sensing part 3, the magnetic detection element 40 is constituted to generate no potential difference when a difference corresponding to the noise occurs between the outputs of the first and second detection coils. Accordingly, the above-mentioned "predetermined multiple" is set to a value suitable for compensating the noise caused by the displacement of the magnet body 31 due to the ambient magnetic field.

The other construction is similar to that in the second embodiment.

According to the third embodiment, it is possible to remove the noise component attributable to the ambient magnetic field, and to compensate the value of acceleration detected by the acceleration sensing part 3. To exactly speaking, the noise component attributable to the ambient magnetic field is given as the sum of noise caused by the ambient magnetic field directly acting on the magnet displacement detection head 32 and noise caused by the magnet body 31 being displaced due to the action of magnetic forces of the ambient magnetic field. The magnitude of total noise of those two kinds of noises can be expressed as a predetermined multiple of the magnitude of the ambient magnetic field. Therefore, the output signal of the magnet displacement detection head 32 can be compensated by subtracting the predetermined multiple of the output of the compensating detection section 42 from the output of the main detection section 41.

Hence the inherent acceleration can be accurately detected.

In addition, the third embodiment can also provide similar advantages to those in the second embodiment.

Fourth Embodiment

Figure 18:
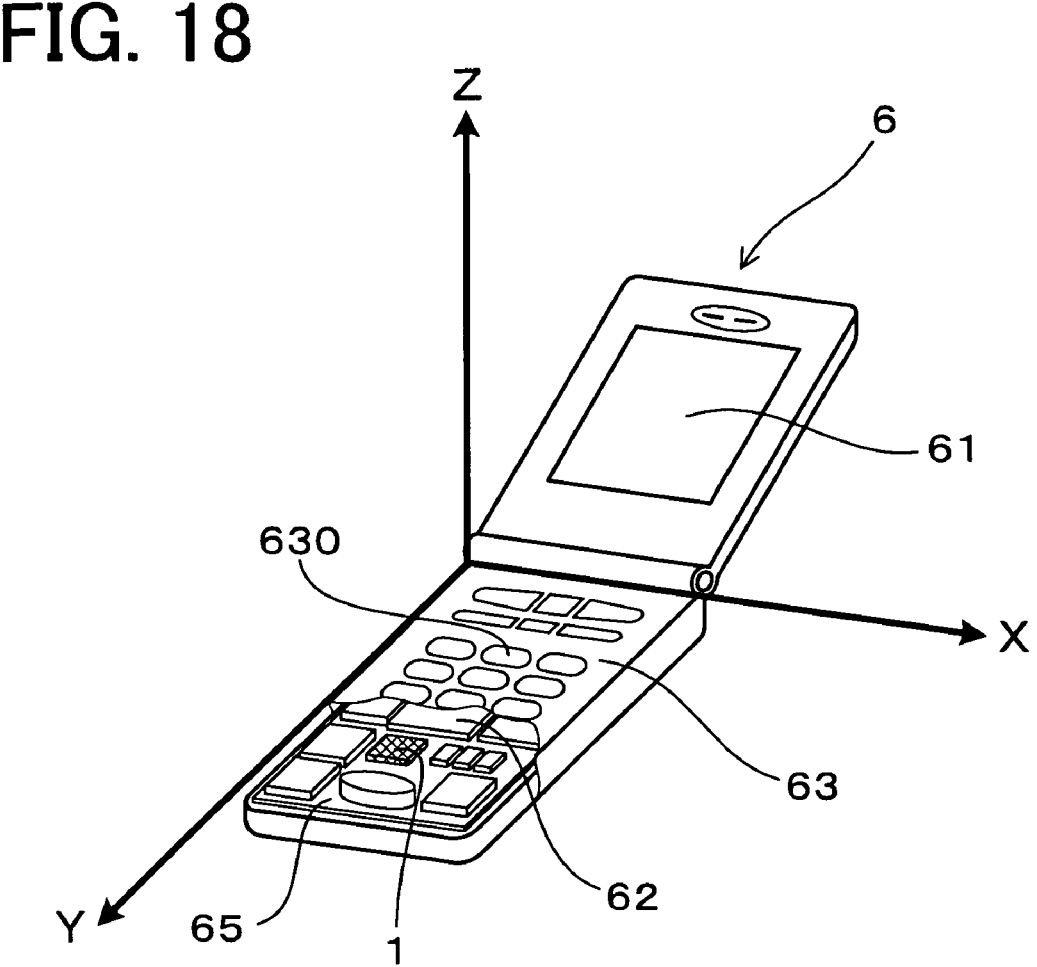
FIG. 18 is a partially cutaway perspective view of a portable telephone according to a fourth embodiment.

This fourth embodiment represents a portable telephone equipped with the motion sensor 1 according to any one of the first to third embodiments. Details of the portable telephone will be described below with reference to FIG. 18.

A portable telephone 6 is designed to perform two-way voice communication by means of radio transmission. The portable telephone 6 includes a motion sensor 1, one-chip microcomputer 62 including a CPU (Central Processing Unit), and a memory element (not shown in the figure) in which an operation program is stored, wherein the small-sized attitude detection sensor 1, the one-chip microcomputer 62, and the memory element are mounted on an internal substrate 65.

The motion sensor 1 detects rotation angles around an X axis, a Y axis, and a Z axis, respectively, which are defined on the portable telephone 6, that is, attitude information represented by a roll angle, a pitch angle and a yaw angle, acceleration information in the X axis, a Y axis, and a Z axis direction, as well as bearing information representing north, south, east and west. The detected information are output to the microcomputer 62.

In the present example, the motion sensor 1 has a very small size. More specifically, for example, the motion sensor 1 has a width of 5.5 mm, a depth of 5.5 mm, and a height of 1.5 mm.

The portable telephone 6 has the function of an Internet browser and is able to display various kinds of information on a liquid crystal screen 61 via the Internet. Also, the portable telephone 6 is constituted such that, when a user inclines a body of the portable telephone 6, an image or a text displayed on the liquid crystal screen 61 can be scrolled in the same direction as that of the inclination. In other words, based on the operation program stored in the memory device, the microcomputer 62 computes the amount of scroll of the liquid crystal screen 61 corresponding to the attitude information outputted from the motion sensor 1.

According to the portable telephone 6 of this embodiment, since the information obtained from the motion sensor 1 assists the operation performed with depression of control buttons 630 arranged on an operating surface 63, the burden required for the user to perform the operation can be reduced.

By shaking the portable telephone 6, other various operations can also be performed by detecting accelerations of the motion of the portable telephone 6. Further, bearing information can be obtained by detecting the geomagnetism with the motion sensor 1.

The remaining construction and operational advantages are similar to those in the first to third embodiments.

The motion sensor of the present invention can be applied to not only the portable telephone as described above, but also other various types of equipment, such as a car navigation system and a game machine.

Obviously, numerous modifications and variations of the present invention are possible in light of the above teachings. It is therefore to be understood that, within the scope of the appended claims, the invention may be practiced otherwise than as specifically described here.

What is claimed is:

1. A motion sensor comprising:
three magnetic sensing parts for detecting magnetic field strength in 3-axis directions orthogonal to one another; and
three acceleration sensing parts for detecting accelerations in the 3-axis directions; wherein
each of the acceleration sensing parts has a magnet body constituted to be able to displace depending on acceleration, and a magnet displacement detection head for detecting a displacement of the magnet body,
the three magnetic sensing parts and the three magnet displacement detection heads being all made of the same type of magnetic detection elements which operate based on common operation principles,
the three magnetic sensing parts and the three acceleration sensing parts being integrated into one modular package together with one electronic circuit for controlling a total of six magnetic detection elements, and
the magnet displacement detection head includes a main detection section for detecting magnetism generated by the magnet body, and a compensating detection section for detecting an ambient magnetic field acting on the magnet displacement detection head, the main detection section and the compensating detection section being arranged to be able to detect magnetism in the same axial direction such that an output signal of the magnet displacement detection head is compensated by subtracting an output of the compensating detection section from an output of the main detection section.

2. The motion sensor according to claim 1, wherein the magnet body is fixed to an other end of a cantilever having one end fixed to a support post which is fixedly provided in the package, and the respective cantilevers of the three acceleration sensing parts are arranged with longitudinal directions thereof being parallel to the same plane.

3. The motion sensor according to claim 1, wherein the magnetic detection elements constituting the three magnetic sensing parts and the magnetic detection elements constituting the three magnet displacement detection heads are each made of a magneto-impedance sensor element.

4. A motion sensor comprising:
three magnetic sensing parts for detecting magnetic field strength in 3-axis directions orthogonal to one another; and
three acceleration sensing parts for detecting accelerations in the 3-axis directions; wherein
each of the acceleration sensing parts has a magnet body constituted to be able to displace depending on acceleration, and a magnet displacement detection head for detecting a displacement of the magnet body,
the three magnetic sensing parts and the three magnet displacement detection heads being all made of the same type of magnetic detection elements which operate based on common operation principles,
the three magnetic sensing parts and the three acceleration sensing parts being integrated into one modular package together with one electronic circuit for controlling a total of six magnetic detection elements, and
the magnet displacement detection head includes a main detection section for detecting magnetism generated by the magnet body, and a compensating detection section for detecting an ambient magnetic field acting on the magnet displacement detection head, the main detection section and the compensating detection section being arranged to be able to detect magnetism in the same axial direction such that an output signal of the magnet displacement detection head is compensated by subtracting a predetermined multiple of an output of the compensating detection section from an output of the main detection section.

5. The motion sensor according to claim 1, wherein the magnet displacement detection head is made of a differential magneto-impedance sensor element having one magneto-sensitive element, a first detection coil, and a second detection coil which are wound over the magneto-sensitive element, the first detection coil constituting a part of the main detection section, the second detection coil constituting a part of the compensating detection section, the first detection coil having one end connected to one end of the second detection coil, and wherein the first detection coil and the second detection coil are wound such that the coils generate output voltages of the same magnitude in opposed directions when a uniform magnetic field acts on the magneto-sensitive element.

6. The motion sensor according to claim 4, wherein the magnet displacement detection head is made of a differential magneto-impedance sensor element comprising one magneto-sensitive element, a first detection coil, and a second detection coil which are wound over the magneto-sensitive element, the first detection coil constituting a part of the main detection section, the second detection coil constituting a part of the compensating detection section, the first detection coil having one end connected to one end of the second detection coil, and wherein the first detection coil and the second detection coil are wound such that the coils generate output voltages in opposed directions with the magnitude of an output voltage from one coil being a predetermined multiple of that from the other coil, when a uniform magnetic field acts on the magneto-sensitive element.

7. The motion sensor according to claim 1, wherein the electronic circuit computes acceleration by executing computation to compensate influence of an ambient magnetic field based on respective outputs of the acceleration sensing parts and the magnetic sensing parts which are arranged such that magnetic sensing directions of the magnetic detection elements thereof are the same.

8. The motion sensor according to claim 1, wherein the electronic circuit controls the six magnetic detection elements with time-sharing.

9. A portable telephone equipped with a motion sensor, the motion sensor comprising:

three magnetic sensing parts for detecting magnetic field strength in 3-axis directions orthogonal to one another; and three acceleration sensing parts for detecting accelerations in the 3-axis directions; wherein each of the acceleration sensing parts has a magnet body constituted to be able to displace depending on acceleration, and a magnet displacement detection head for detecting a displacement of the magnet body, the three magnetic sensing parts and the three magnet displacement detection heads being all made of the same type of magnetic detection elements which operate based on common operation principles, the three magnetic sensing parts and the three acceleration sensing parts being integrated into one modular package together with one electronic circuit for controlling a total of six magnetic detection elements, and the magnet displacement detection head includes a main detection section for detecting magnetism generated by the magnet body, and a compensating detection section for detecting an ambient magnetic field acting on the magnet displacement detection head, the main detection section and the compensating detection section being arranged to be able to detect magnetism in the same axial direction such that an output signal of the magnet displacement detection head is compensated by subtracting an output of the compensating detection section from an output of the main detection section.

10. The portable telephone according to claim 9, wherein the magnet body is fixed to an other end of a cantilever having one end fixed to a support post which is fixedly provided in the package, and the respective cantilevers of the three acceleration sensing parts are arranged with longitudinal directions thereof being parallel to the same plane.

11. The portable telephone according to claim 9, wherein the magnetic detection elements constituting the three magnetic sensing parts and the magnetic detection elements constituting the three magnet displacement detection heads are each made of a magneto-impedance sensor element.

12. A portable telephone equipped with a motion sensor, the motion sensor comprising:

three magnetic sensing parts for detecting magnetic field strength in 3-axis directions orthogonal to one another; and three acceleration sensing parts for detecting accelerations in the 3-axis directions; wherein each of the acceleration sensing parts has a magnet body constituted to be able to displace depending on acceleration, and a magnet displacement detection head for detecting a displacement of the magnet body, the three magnetic sensing parts and the three magnet displacement detection heads being all made of the same type of magnetic detection elements which operate based on common operation principles, the three magnetic sensing parts and the three acceleration sensing parts being integrated into one modular package together with one electronic circuit for controlling a total of six magnetic detection elements, and the magnet displacement detection head includes a main detection section for detecting magnetism generated by the magnet body, and a compensating detection section for detecting an ambient magnetic field acting on the magnet displacement detection head, the main detection section and the compensating detection section being arranged to be able to detect magnetism in the same axial direction such that an output signal of the magnet displacement detection head is compensated by subtracting a predetermined multiple of an output of the compensating detection section from an output of the main detection section.

13. The portable telephone according to claim 9, wherein the magnet displacement detection head is made of a differential magneto-impedance sensor element having one magneto-sensitive element, a first detection coil, and a second detection coil which are wound over the magneto-sensitive element, the first detection coil constituting a part of the main detection section, the second detection coil constituting a part of the compensating detection section, the first detection coil having one end connected to one end of the second detection coil, and wherein the first detection coil and the second detection coil are wound such that the coils generate output voltages of the same magnitude in opposed directions when a uniform magnetic field acts on the magneto-sensitive element.

14. The portable telephone according to claim 12, wherein the magnet displacement detection head is made of a differential magneto-impedance sensor element comprising one magneto-sensitive element, a first detection coil, and a second detection coil which are wound over the magneto-sensitive element, the first detection coil constituting a part of the main detection section, the second detection coil constituting a part of the compensating detection section, the first detection coil having one end connected to one end of the second detection coil, and wherein the first detection coil and the second detection coil are wound such that the coils generate output voltages in opposed directions with the magnitude of an output voltage from one coil being a predetermined multiple of that from the other coil, when a uniform magnetic field acts on the magneto-sensitive element.

15. The portable telephone according to claim 9, wherein the electronic circuit computes acceleration by executing computation to compensate influence of an ambient magnetic field based on respective outputs of the acceleration sensing parts and the magnetic sensing parts which are arranged such that magnetic sensing directions of the magnetic detection elements thereof are the same.

16. The portable telephone according to claim 9, wherein the electronic circuit controls the six magnetic detection elements with time-sharing.

17. The motion sensor according to claim 4, wherein the magnet body is fixed to an other end of a cantilever having one end fixed to a support post which is fixedly provided in the package, and the respective cantilevers of the three acceleration sensing parts are arranged with longitudinal directions thereof being parallel to the same plane.

18. The motion sensor according to claim 4, wherein the magnetic detection elements constituting the three magnetic sensing parts and the magnetic detection elements constituting the three magnet displacement detection heads are each made of a magneto-impedance sensor element.

19. The motion sensor according to claim 4, wherein the electronic circuit computes acceleration by executing computation to compensate influence of an ambient magnetic field based on respective outputs of the acceleration sensing parts and the magnetic sensing parts which are arranged such that magnetic sensing directions of the magnetic detection elements thereof are the same.

20. The motion sensor according to claim 4, wherein the electronic circuit controls the six magnetic detection elements with time-sharing.

21. The portable telephone according to claim 2, wherein the magnet body is fixed to an other end of a cantilever having one end fixed to a support post which is fixedly provided in the package, and the respective cantilevers of the three acceleration sensing parts are arranged with longitudinal directions thereof being parallel to the same plane.

22. The portable telephone according to claim 12, wherein the magnetic detection elements constituting the three magnetic sensing parts and the magnetic detection elements constituting the three magnet displacement detection heads are each made of a magneto-impedance sensor element.

23. The portable telephone according to claim 12, wherein the electronic circuit computes acceleration by executing computation to compensate influence of an ambient magnetic field based on respective outputs of the acceleration sensing parts and the magnetic sensing parts which are arranged such that magnetic sensing directions of the magnetic detection elements thereof are the same.

24. The portable telephone according to claim 12, wherein the electronic circuit controls the six magnetic detection elements with time-sharing.

\* \* \* \* \*